United States Patent
Lee et al.

(10) Patent No.: US 8,285,663 B2
(45) Date of Patent: Oct. 9, 2012

(54) DEVICE AND METHOD OF PROCESSING RULES BASED ON WEB SERVICES

(75) Inventors: Kangchan Lee, Daejeon (KR);
Won-Suk Lee, Daejeon (KR);
Jong-Hong Jeon, Daejeon (KR);
Seung-Yun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 626 days.

(21) Appl. No.: 12/517,671

(22) PCT Filed: Aug. 22, 2007

(86) PCT No.: PCT/KR2007/004003
§ 371 (c)(1),
(2), (4) Date: Jun. 4, 2009

(87) PCT Pub. No.: WO2008/069402
PCT Pub. Date: Jun. 12, 2008

(65) Prior Publication Data
US 2010/0010954 A1    Jan. 14, 2010

(30) Foreign Application Priority Data
Dec. 8, 2006   (KR) .................. 10-2006-0125026

(51) Int. Cl.
*G06F 17/00* (2006.01)

(52) U.S. Cl. ........................................... 706/47

(58) Field of Classification Search .................. None
See application file for complete search history.

(56) References Cited

U.S. PATENT DOCUMENTS 7,603,358 B1 * 10/2009 Anderson et al. ............... 1/1

FOREIGN PATENT DOCUMENTS

| JP | 2001-331511 A | 11/2001 |
|---|---|---|
| JP | 16-078517 A | 3/2004 |
| JP | 2004-078517 A | 3/2004 |
| KR | 1996-0029973 A | 8/1996 |
| KR | 1020060061190 A | 6/2006 |
| KR | 1020060087998 A | 8/2006 |
| WO | 2005/055089 A1 | 6/2005 |

OTHER PUBLICATIONS

James Bailey, et al; "An Event-Condition-Action Language for XML", Department of Computer Science, University of Melbourne, Melbourne, Australia, pp. 1-28.

(Continued)

*Primary Examiner* — Alan Chen
(74) *Attorney, Agent, or Firm* — Ladas & Parry LLP (57) ABSTRACT

Provided is a device for storing a rule describing an event, a condition to be satisfied by the event, and an action to be executed when the condition is satisfied and executing the action of the rule in an expended structure for using web services so as to effectively process the web services in various devices as well as a computer. In addition, a global rule manager for inspecting the validity of the rule when the rule is stored and executed is provided. Accordingly, the web services can be effectively used in a ubiquitous environment.

16 Claims, 7 Drawing Sheets

OTHER PUBLICATIONS

Jae-Yoon Jung, et al; "[Position Paper] WS-ECA: An ECA Rule Description Language for Ubiquitous Services Computing" WWW 2006, May 22 6, 2006, Edinburgh UK.

International Search Report; mailed Nov. 27, 2007, PCT/KR2007/004003.

Atsunori Takeuchi, et al; "Access Control of Web Content Based on Access Histories, Aggregations and Meta-Rules", IEIC Technical Report (Institute of Electronics, Information and Communication Engineers) vol. 100, No. 227(Dec. 2000), pp. 171-178.

Hidenari Kiyomitsu, et al; "ActiveWeb: XML-based Reconfiguration for Web Personalization and Access Control", IPSJ Transaction on Databases, vol. 42, No. SIG8(TOD-10), pp. 139-147, Jul. 2001.

* cited by examiner

DEVICE AND METHOD OF PROCESSING RULES BASED ON WEB SERVICES

TECHNICAL FIELD

This application claims the benefit of Korean Patent Application No. 10-2006-0125026, filed on Dec. 8, 2006, in the Korean Intellectual Property Office, the disclosure of which is incorporated herein in its entirety by reference.

The present invention relates to a web service, and more particularly, to a device and method of processing rules based on web services.

BACKGROUND ART

Figure 1:
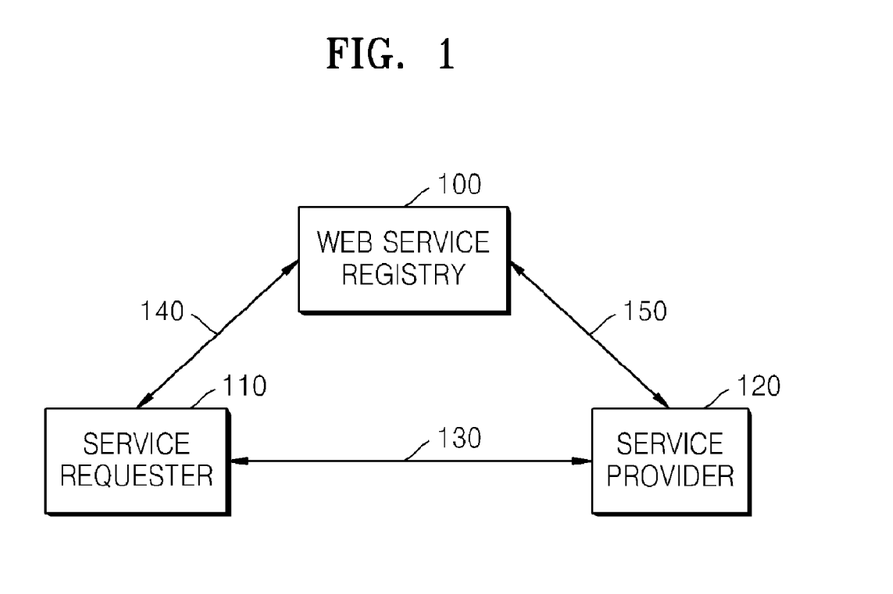
FIG. 1 is a basic structural view of a web service according to a related art.

FIG. 1 is a basic structural view of a web service according to a related art.

Referring to FIG. 1, the web service includes a web service registry 100, a service requester 110, and a service provider 120.

The service provider 120 publishes interface information on a service to be provided to the web service registry 100. The interface information includes web services description language (WSDL). The service requester 110 searches the web service registry 100 for a desired web service and receives interface information needed to use the service. The service requester 110 receives the desired service from the service provider 120 using the interface information. In this case, messages between the service requester 110, the web service registry 100, and the service provider 120 have a simple object access protocol (SOAP) message type. A number of interactions are needed between the service requester 110 and the service provider 120, and messages exchanged in this case are also based on the SOAP.

DISCLOSURE OF INVENTION

Technical Problem

In a ubiquitous computing environment, a number of devices are disposed in places to cooperate with each other in order to perform a desired purpose. As the number of distributed devices increases and network efficiency becomes more important, a function whereby the devices can actively interact with each other through simple messages according to given rules is needed. However, a current web service has not been provided with such a function.

Technical Solution

The present invention provides a method of processing rules based on web services in which distributed devices cooperate with each other through the event exchange based on the web service, and a web service application method is described by a rule that is defined by combining an event, a condition, and an action, so that the web services can be automatically and effectively used by a small terminal in addition to a general computer in a ubiquitous environment.

Advantageous Effects

By using the devices for processing the rules based on the web services, the global rule manager, and the method of processing the rules based on the web services, the web services can be easily and effectively used by a small terminal in addition to a general computer in the ubiquitous environment.

DESCRIPTION OF DRAWINGS

The above and other features and advantages of the present invention will become more apparent by describing in detail exemplary embodiments thereof with reference to the attached drawings in which.

BEST MODE

According to an aspect of the present invention, there is provided a device for processing rules based on web services including: a rule storage storing rules describing an event, a condition to be satisfied by the event, and an action to be executed when the condition is satisfied; a rule engine retrieving a rule describing the event from the rules stored in the rule storage when an event occurs; a condition inspector inspecting whether or not the event satisfies the condition described in the retrieved rule; and an action executor executing the action described in the retrieved rule when the event satisfies the condition.

According to another aspect of the present invention, there is provided a global rule manager for processing rules based on web services, including: a build-time rule verifier verifying a build-time rule validity from whether a static conflict in which a rule describing an event, a condition to be satisfied by the event, and an action to be executed when the condition is satisfied describes the same event and condition as those of other rules but describes an action that cannot be simultaneously executed occurs and a possibility of an occurrence of a dynamic conflict in which the rule does not generate the static conflict but describes an action that cannot be executed along with actions described in other rules; and a run-time rule verifier verifying a run-time rule validity from whether, when an event occurs, a rule describing the event generates a dynamic conflict in which the rule describes an action that cannot be simultaneously executed along with an action described in another rule that is currently being executed.

According to another aspect of the present invention, there is provided a method of using rules based on web services including: (a) storing rules describing an event, a condition to be satisfied by the event, and an action to be executed when the condition is satisfied; (b) when an event occurs, retrieving a rule describing the event from the rules stored in a rule storage; (c) inspecting whether or not the event satisfies a condition described in the retrieved rule; and (d) when the event satisfies the condition, executing an action described in the retrieved rule.

According to another aspect of the present invention, there is provided a method of using rules based on web services including: (a) determining whether or not a rule describing an event, a condition to be satisfied by the event, and an action to be executed when the condition is satisfied generates a static conflict in which the rule describes the same event and condition as those of other rules but describes an action that cannot be simultaneously executed; (b) when the rule does not generate the static conflict, determining whether or not there is a possibility of an occurrence of a dynamic conflict in which the rule describes an action that cannot be simultaneously executed along with actions described in other rules; and (c) when an event occurs, determining whether or not a rule describing the event generates the dynamic conflict in which the rule describes an action that cannot be simultaneously executed with an action described in a rule to be currently executed.

MODE FOR INVENTION

Hereinafter, exemplary embodiments of the present invention will be described in detail with reference to the attached drawings.

Figure 2:
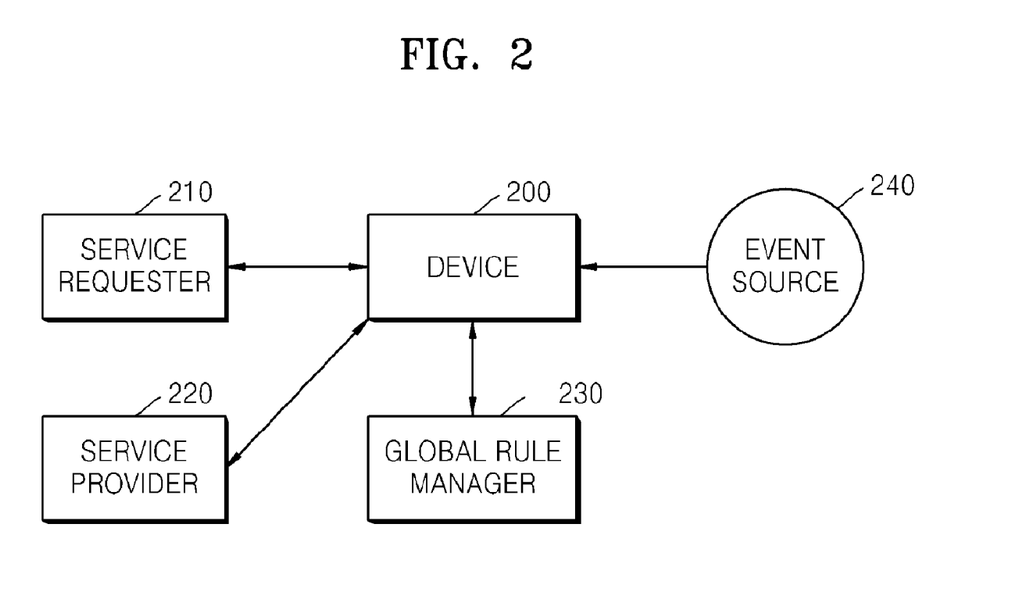
FIG. 2 is a structural view of a web service according to an embodiment of the present invention.

FIG. 2 is a structural view of a web service according to an embodiment of the present invention.

Referring to FIG. 2, in order to provide the web service according to the current embodiment of the present invention, there is provided devices 200, a service requester 210, a service provider 220, a global rule manager 230, and an event source 240.

In the web service according to the embodiment of the present invention, a traditional event-condition-action (ECA) rule (hereinafter, referred to as 'a rule') is processed by a web service method.

To deliver an event, event exchange between devices based on the web service is performed by means of an eventing message based on the web service. A rule stored in a device is triggered in response to the eventing message based on the web service. When a condition is satisfied, a defined action is performed.

The defined action calls a service inside or outside the device or generates another event to internally or externally deliver the event. By means of the event delivery and the service call, a number of distributed devices interact with each other.

The service requester 210 is a web service client that uses a web service and delivers the event rule to the device 200. The service provider 220 means a general web service, and performs the same functions as those of the service provider 120 in a conventional web service application structure.

The event source 240 delivers a change in a status of the event source 240 of web services by using an event notification message. The devices 200 and the global rule manager 230 store an event rule, receive the event notification message from the event source 240, and have a function of executing a rule corresponding to the event.

The devices 200 each have their own rules and serve as general event rule executors for inspecting a corresponding rule whenever an event occurs and performing a required action. The global rule manager 230 detects rules which may cause a contradiction or conflict when the devices 200 execute the rules and performs operations to solve the problems.

Figure 3:
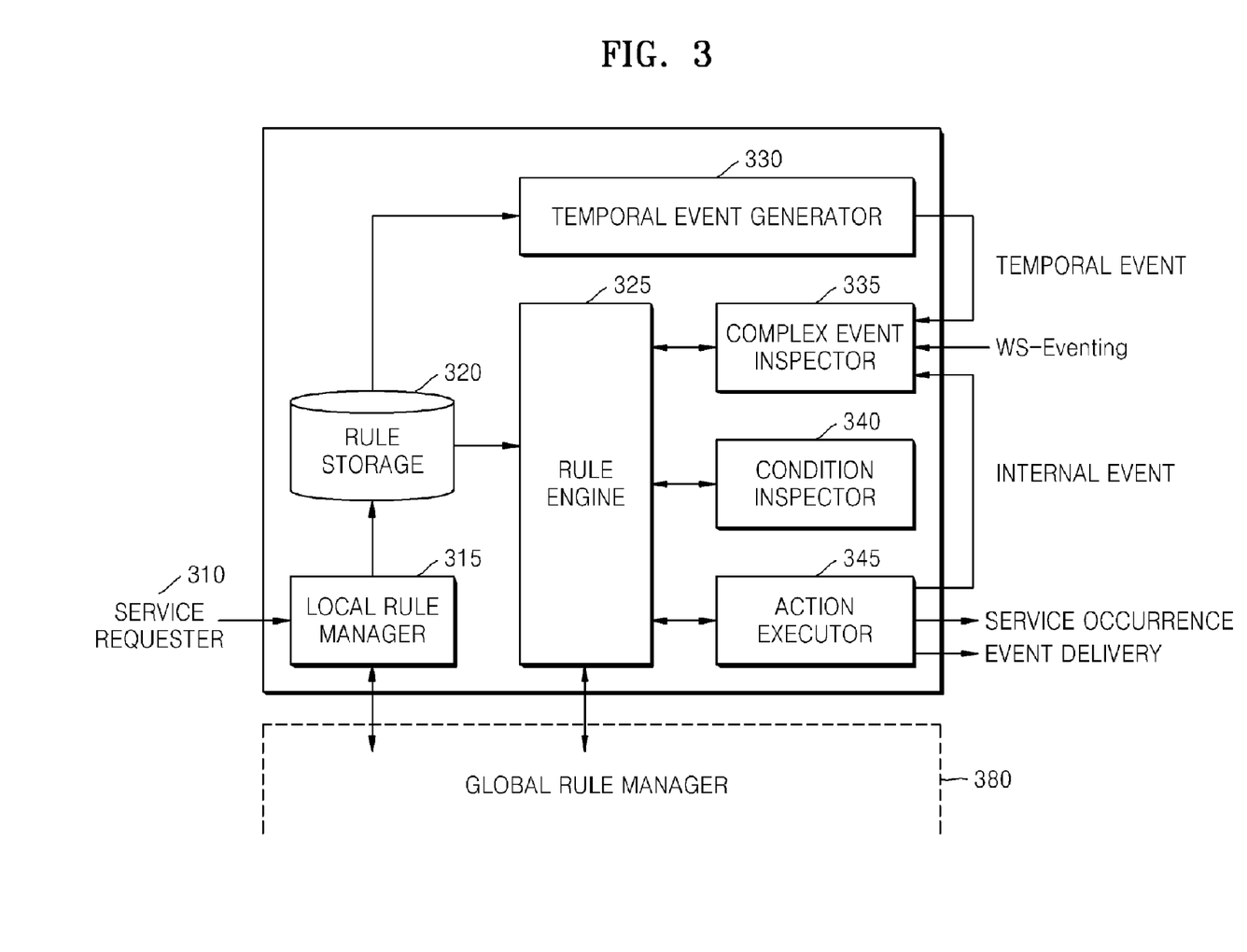
FIG. 3 is a structural view of a device according to an embodiment of the present invention.

FIG. 3 is a structural view of a device according to an embodiment of the present invention.

Referring to FIG. 3, the device according to the current embodiment of the present invention includes a local rule manager 315, a rule storage 320, a rule engine 325, a time event generator 330, a complex event inspector 335, a condition inspector 340, and an action executor 345.

The local rule manager 315 has a function of managing rules stored in the device. When a rule is requested to be registered in a device, the local rule manager 315 inspects a valid period of the rule and delivers the rule to the global rule manager in order to determine whether or not rules defined in the rule are contradictory to rules stored in the local rule manager 315 or other devices. When the rule is valid, the rule is stored in the rule storage 320, and the local rule manager 315 processes the validity of the rule and requests of a user associated with the rule.

The temporal event generator 330 generates a temporal event defined in the rule and delivers the temporal event to the complex event inspector 335. The complex event inspector 335 receives events which externally or internally occur and determines whether or not a corresponding event is described in the rule. Examples of messages delivered to the complex event inspector 335 include an event delivery message delivered from an external web service by using a standard such as WS-Eventing, a temporal event generated by the temporal event generator 330, and an internal event generated by the action executor 345. When the complex event inspector 335 receives an event, the complex event inspector 335 receives information on the currently valid rule from the rule engine 325 and determines whether the currently received event of the corresponding rule is valid or the complex event inspector 335 has to wait for another event, or the like. When an event occurs, this event is delivered to the rule engine 325 to perform following operations.

The rule engine 325 is notified by the complex event inspector 335 which of the rules is associated with the occurred event and delivers a condition equation of the rule to the condition inspector 340. The condition inspector 340 inspects the delivered condition equation and delivers whether true or false to the rule engine 325.

The rule engine 325 delivers to the action executor 345 actions of the rule which is associated with the occurred event and has a condition that is true. The action executor 345 performs the described actions.

The rule engine 325 has a function of providing associated information to allow the complex event inspector 335, the condition inspector 340, and the action executor 345 to perform operations corresponding to the rule using information on the currently valid rule from the local rule manager 315. More specifically, the rule engine 325 delivers to the complex event inspector 335 which of the rules is associated with the event inspected by the rule engine 325 and contents of the events described in the rule in order to allow the complex event inspector 335 to determine whether the complex event inspector 335 has to wait for another event or the complex event inspector 335 has to process the contents of the event. The rule engine 325 delivers the condition equation of the rule associated with the currently occurring event to the condition inspector 340 in order to allow the condition inspector 340 to determine whether or not the condition inspector 340 will execute the actions. The rule engine 325 delivers information on operations to be performed by the rule which is associated with the occurred event and has a condition equation that is satisfied to the action executor 345.

In addition, when an event with a specific rule is detected by the complex event inspector 335 and the rule has the possibility of a dynamic conflict with another rule, the rule engine 325 notifies the global rule manager 380 of that situation, and after the conflict is solved, the rule engine executes the rule.

Figure 4:
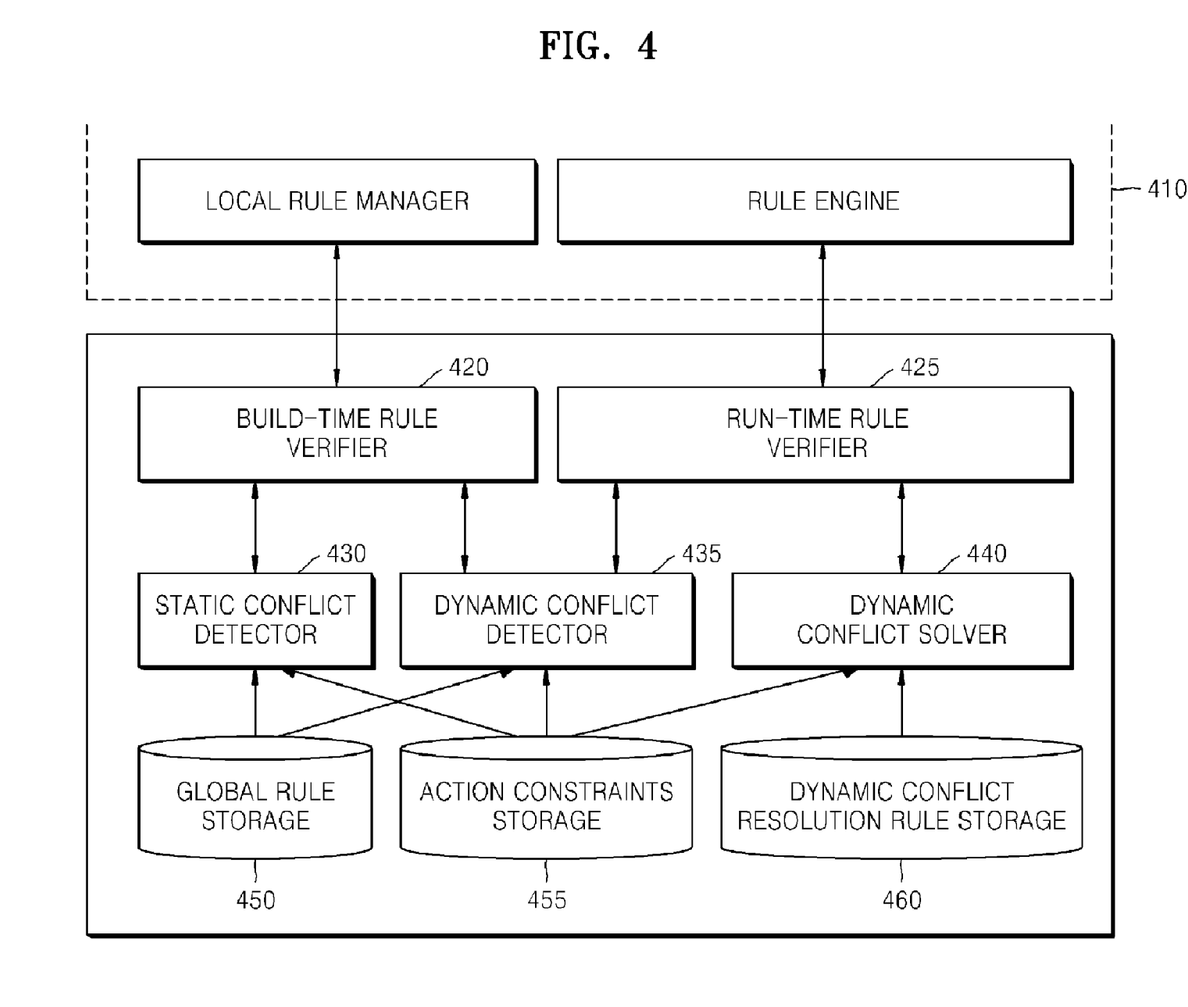
FIG. 4 is a structural view of a global rule manager according to an embodiment of the present invention.

FIG. 4 is a structural view of the global rule manager according to an embodiment of the present invention.

Referring to FIG. 4, the global rule manager according to the current embodiment of the present invention includes two rule verifiers 420 and 425, conflict detectors 430 and 435 and a conflict solver 440 for processing a request, and three storages 450, 455, and 460 for storing rules and standards for verifying and processing them.

The global rule manager has two roles. One role is to verify a static conflict of a rule during a build-time and check whether the conditions are right for a dynamic conflict to occur, and the other role is to confirm whether or not a dynamic conflict of the rule occurs during a run-time and solve the dynamic conflict.

The rule verifiers 420 and 425 are verifiers for rules executed during the build-time and run-time, respectively.

The build-time rule verifier 420 is called when a new rule is registered. The build-time rule verifier 420 verifies whether or not the new rule is in static conflict with other rules or has possibility of a dynamic conflict, and notifies a user of the verification. When the static conflict occurs, the service requester has to modify the rule, and when the dynamic conflict may occur, the service requester has to define a dynamic conflict resolution rule representing a method of solving the dynamic conflict.

The run-time rule verifier 425 is called just before the rule which has the possibility of the dynamic conflict with another rule is executed. The run-time rule verifier 425 verifies whether or not a dynamic conflict occurs, and if the conflict occurs, a resolution method is delivered to the devices according to the dynamic conflict resolution rule defined in advance.

Next, the global rule manager also includes the conflict detectors 430 and 435 and the dynamic conflict solver 440. The static conflict detector 430 and the dynamic conflict detector 435 execute algorithms for detecting the static conflict and the dynamic conflict, respectively, on the basis of the rules stored in the global rule storage 450 and the action constraints storage 455. The dynamic conflict solver 440 executes an algorithm for solving the dynamic conflict on the basis of the dynamic conflict resolution rule stored in the dynamic conflict resolution rule storage 460.

The global rule manager includes three storages for processing the aforementioned operations. The global rule storage 450 possesses rules registered in all devices managed by the global rule manager. The action constraints storage 455 stores action constraints which define two or more actions of the devices that cannot occur at the same time. The action constraints are used as standards for detecting the static conflict or the dynamic conflict of actions that are generated by the same event. The dynamic conflict resolution rule storage 460 stores a dynamic conflict resolution rule storing standards for solving the dynamic conflicts which can occur when the rule is executed.

Figure 5:
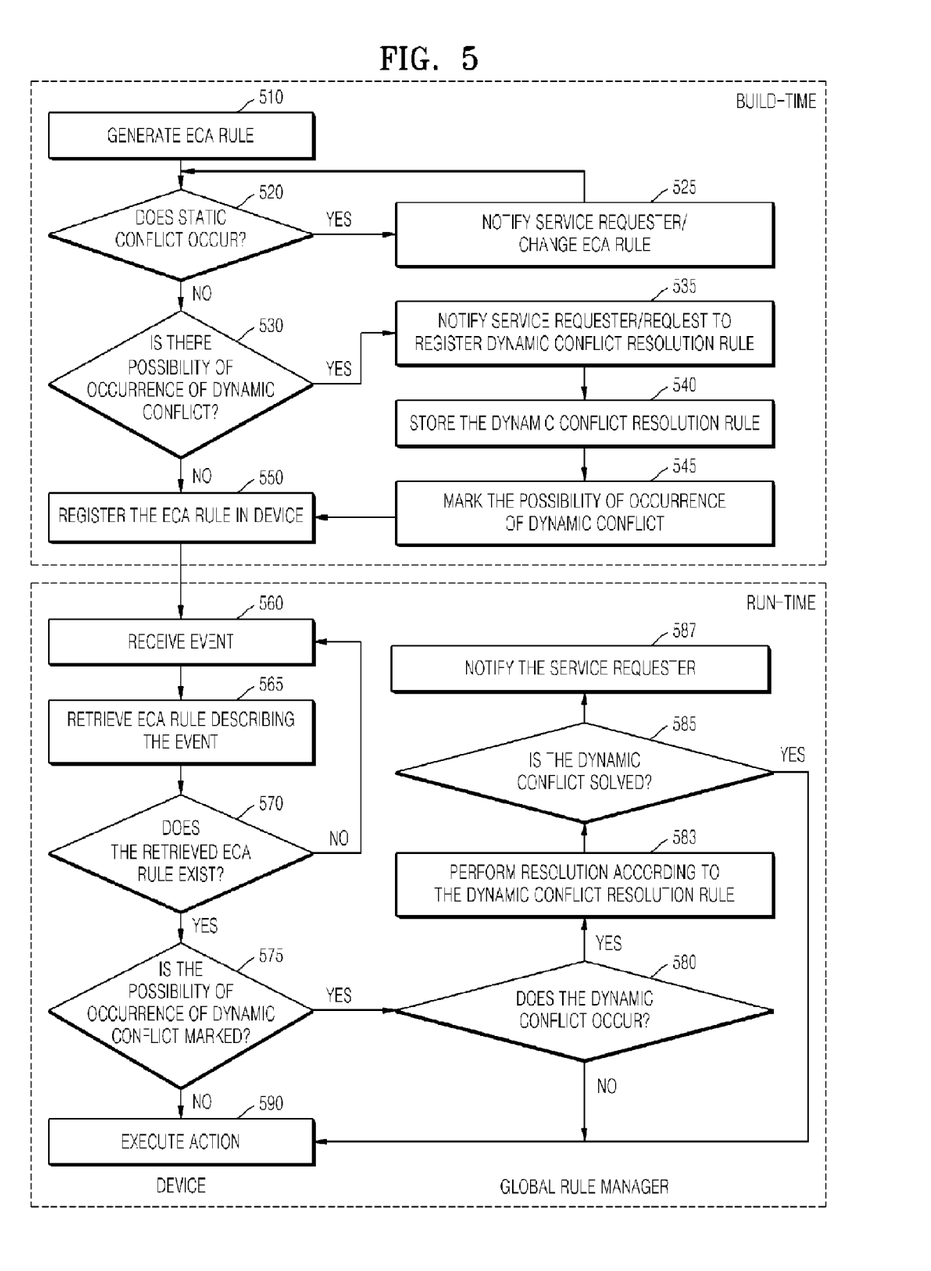
FIG. 5 is a flowchart of a method of using rules based on web services according to an embodiment of the present invention.

FIG. 5 is a flowchart of a method of using rules based on web services according to an embodiment of the present invention.

Referring to FIG. 5, a user generates a new rule during a build-time (operation 510). The generated rule is delivered to the global rule manager, and it is determined on the basis of the action constraints whether or not a static conflict occurs (operation 520). If a static conflict occurs, the rule cannot be registered in the device. Therefore, the user is notified and ordered to modify the rule (operation 525). If the static conflict does not occur, it is determined whether or not there is a possibility of an occurrence of a dynamic conflict when the event rule is being executed (operation 530). When the possibility exists, the user is notified about the possibility and informed of a situation (a specific event and a condition) and an action (conflicted rules and action conditions) in which the dynamic conflict may occur and is ordered to define the dynamic conflict resolution rule for determining how to act in this situation (operation 535). When the resolution rule is defined, the resolution rule is registered along with the rule (operations 540 and 550). Here, the rule which has the possibility of the conflict with another rule is marked (operation 545) so that the global rule manager is notified whether the dynamic conflict occurs before the device processes the rule during the run-time.

The rule with the resolution for the possibility that the static conflict does not occur and the dynamic conflict can occur is registered in the device so as to wait for an event (operation 560). When a rule which is triggered by the event exists (operation 565), it is verified whether or not a condition is satisfied and activated (operation 570). When the activated rule does not have the possibility of a dynamic conflict with another rule at all, the device processes an action defined in the rule. However, for the marked rule which may occur the dynamic conflict (operation 575), the global rule manager determines whether or not a dynamic conflict occurs. Here, if the dynamic conflict does not occur, the device processes the rule (operation 590), and if the dynamic conflict occurs, the device executes the dynamic conflict resolution rule defined in advance (operation 583). According to the resolution representing how to solve the conflict, the device is informed (operation 587) whether or not to execute the rule (operation 585).

Figure 6:
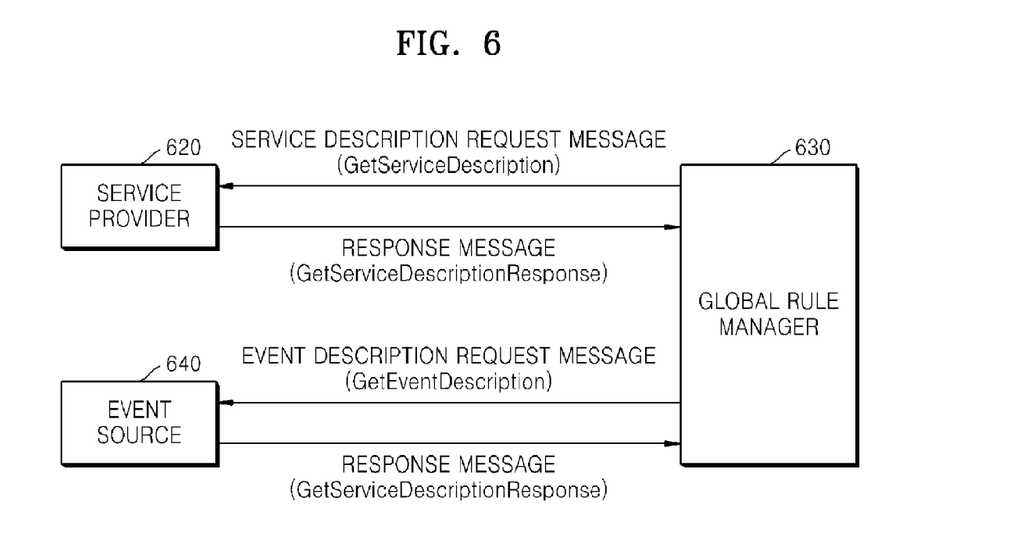
FIG. 6 is a block diagram showing a rule service/event description request protocol according to an embodiment of the present invention.

FIG. 6 is a block diagram showing a rule service/event description request protocol according to an embodiment of the present invention.

Referring to FIG. 6, services and event descriptions provided by the service provider 620 and the event source 640 are managed by the global rule manager 630 in order to help a rule management such as processing the rule conflict and errors or help the service requester to easily describe the rule. The web service uses Web Services Description Language (WSDL) in order to describe services provided by the web service and notify client applications of the services. In the WSDL, a definition with a complex type used for a factor and a return value of the web service, messages to be transceived with other web services, remote procedures provided by web service, a protocol used to call a web service, and endpoint information on a web service system are described. However, the aforementioned information is described based on the procedures called by the client application of the web service, so the event source 640 cannot describe event notification message information provided by the event source 640. Operations provided in the protocol are as follows.

Figure 7:
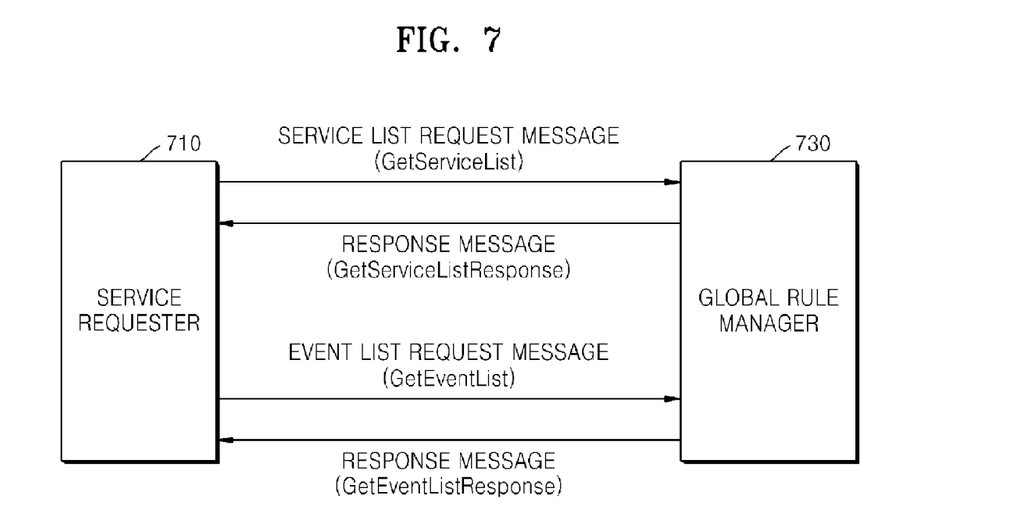
FIG. 7 is a block diagram showing a service/event list request protocol according to an embodiment of the present invention.

GetServiceDescription: a service description request message transmitted from the global rule manager to the service provider GetServiceDescriptionResponse: a response message for responding to the global rule manager about information on the service of the service provider GetEventDescription: a message for requesting event description from the global rule manager to the event source GetEventDescriptionResponse: a response message about event description provided by the event source FIG. 7 is a block diagram showing a service/event list request protocol according to an embodiment of the present invention.

Referring to FIG. 7, in order for the service requester 710 to describe the rule, the service requester 710 has to know what services and events exist in a network connected to the service requester 710. In order to obtain this information, the service requester 710 may deliver the GetServiceDescription and GetEventDescription messages to the service provider 620 and the event source 640, respectively, so that it can receive the response messages in return. However, in this method, the service requester 710 has to know positions of all components in the network, and messages having the same content have to be delivered to a number of components, so that the efficiency of the network decreases. Accordingly, this method is not recommended.

Therefore, alternatively, an information exchange mechanism between the global rule manager 730 and the service requester 710 is used. The global rule manager 730 delivers the GetServiceDescription and the GetEventDescription messages to the service provider 620 and the event source 640, respectively, and obtains information on the services and the events provided therefrom. The service requester 710 requests the descriptions of the global rule manager 730 so as to obtain all of the information that can be used by the service requester 710. Operations used in the protocol are as follows.

GetServiceList: a message instructing the service requester 710 to request a service list of the global rule manager 730

GetServiceListResponse: a message instructing the global rule manager 730 to deliver a result of the service list requested by the service requester 710

GetEventList: a message instructing the service requester 710 to request an event list of the global rule manager 730

GetEventListResponse: a message instructing the global rule manager 730 to deliver a result of the event list requested by the service requester 710

Figure 8:
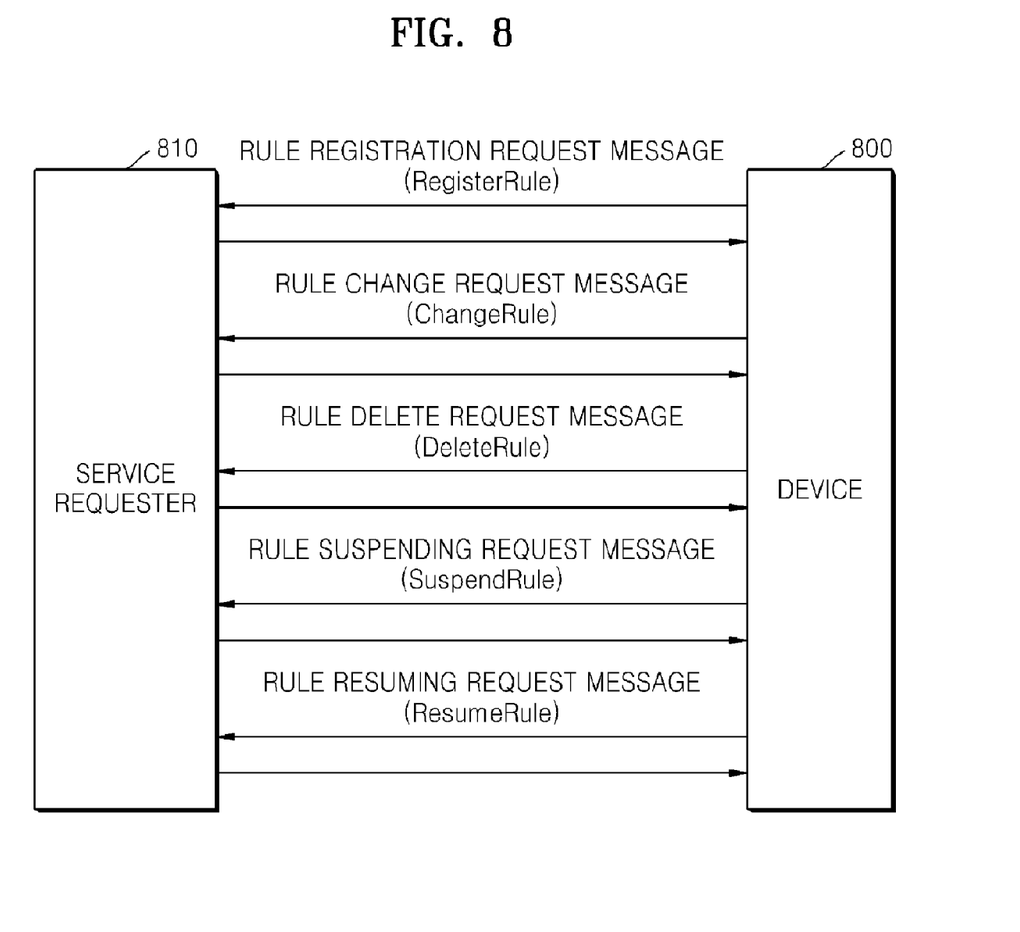
FIG. 8 is a block diagram showing an event rule register, change, delete, suspend, and resume protocol according to an embodiment of the present invention.

FIG. 8 is a block diagram showing an event rule register, change, delete, suspend, and resume protocol according to an embodiment of the present invention.

Referring to FIG. 8, the service requester 810 delivers rules that are described by the service requester 810 to the device 800 and expects that the device has a dynamic relationship with a service provider 220 and an event source 240 according to the rules. In the meanwhile, the service requester 810 has to deliver the rules to the device 800 and change or delete the rule, or suspend or resume the application of the rule as needed. Operations used in the protocol are as follows.

RegisterRule: a message for instructing the service requester 810 to distribute an event rule to the device 800, which is described according to a grammar so as to be used for the service requester 810.

Figure 9:
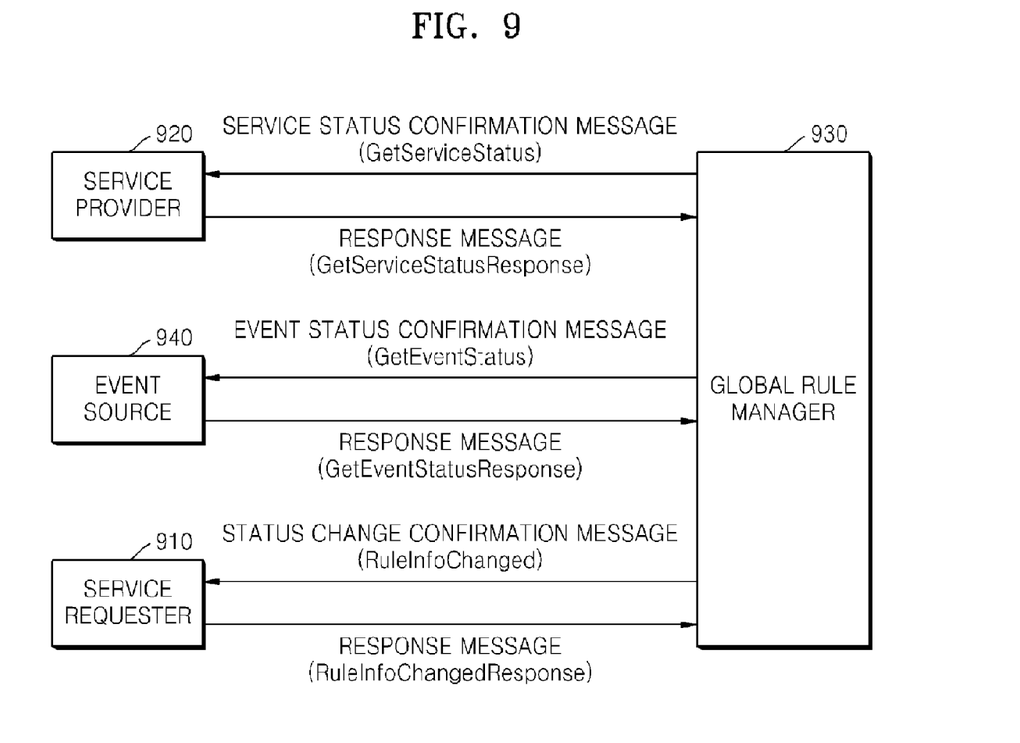
FIG. 9 is a block diagram showing a service/event status confirm and notify protocol according to an embodiment of the present invention.

ChangeRule: a message for instructing the service requester 810 to change the event rule delivered to the device 800 in advance DeleteRule: a message delivered by the service requester 810 when the event rule distributed in advance needs to be deleted SuspendRule: a message delivered to the device 800 by the service requester 810 when the service requester 810 does not want to use the rule distributed to the device 800 temporarily ResumeRule: a message delivered when the service requester 810 has to use the rule again after requesting the device 800 to suspend using the rule, namely, when the suspend period is not stated in the SuspendRule message, or the rule has to be used earlier than the suspend period stated in the SuspendRule message FIG. 9 is a block diagram showing a service/event status confirm and notify protocol according to an embodiment of the present invention.

Referring to FIG. 9, the rule distributed to the device 200 is defined with reference to the service provided by the service provider 920 or contents of the event notification message delivered from the event source 940. However, it is not assumed that the services and events which can be used when the rules are distributed at first in the ubiquitous environment can be continuously used. Basically, in the ubiquitous environment, since an ad-hoc network is possible in various environments, the services and events may be deleted or may not be used temporarily as needed. In order to process the aforementioned circumstances, information on when a new service provider advertises in the network, or the service provider is removed from the network is informed to the service requester.

However, this information is limited to a specific network, so the functions may not be provided to all the networks.

Therefore, the embodiment of the present invention provides a protocol in which the global rule manager 930 inspects the status of the service provider 920 and the event source 940, and when the services and events described in the rules defined by the service requester 910 are not valid on the basis on the information, this can be notified to the service requester 910 to modify the rules. Operations used in the protocol are as follows.

Figure 10:
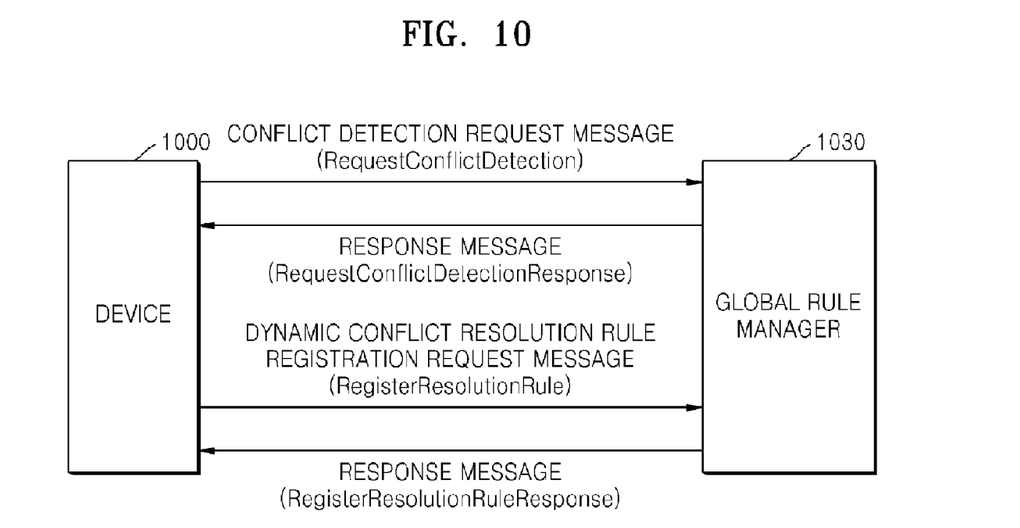
FIG. 10 is a block diagram showing a conflict confirmation request protocol before rule registration according to an embodiment of the present invention.

GetServiceStatus: a status confirmation request message delivered to the service provider 920 by the global rule manager 930 in order to confirm the status of the service GetServiceStatusResponse: a response message to the GetServiceStatus GetEventStatus: an event status confirmation request message delivered to the event source 940 by the global rule manager 930 instructing the event source 940 to confirm the status of the event provided GetEventStatusResponse: a response message to the GetEventStatus RuleInfoChanged: a message delivered to the service requester 910 when the status is changed and the rule cannot be properly executed after the global rule manager 930 confirms the status of the service and the event RuleInfoChangedResponse: a response message to the RuleInfoChanged FIG. 10 is a block diagram showing a conflict confirmation request protocol before rule registration according to an embodiment of the present invention.

Referring to FIG. 10, the device 1000 registers the dynamic conflict resolution rule as a protocol for requesting detection of the static conflict and the dynamic conflict to the global rule manager 1030 before registering the rule if needed.

Operations used in the protocol are as follows.

RequestConflictDetection: a message delivered by the device 1000 to request the global rule manager 1030 to detect the conflict RequestConflictDetectionResponse: a response message to the RequestConflictDetection RegisterResolutionRule: a message delivered by the device 1000 to request the dynamic conflict resolution rule of the global rule manager 1030

RegisterResolutionRuleResponse: a response message to the RegisterResolutionRule The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A device for processing rules based on web services comprising:
   a rule storage storing rules describing an event, a condition to be satisfied by the event, and an action to be executed when the condition is satisfied;
   a rule engine retrieving a rule describing the event from the rules stored in the rule storage when an event occurs;
   a condition inspector inspecting whether or not the event satisfies the condition described in the retrieved rule; and
   an action executor executing the action described in the retrieved rule when the event satisfies the condition; and
   a local rule manager storing the rule requested to be registered when the rule is requested to be registered by a service requester and does not generate a static conflict in which the rule requested to be registered describes the same event and condition as those of another rule but describes an action that cannot be simultaneously executed.

2. The device of claim 1, wherein the local rule manager stores the rule requested to be registered when the rule requested to be registered is within a valid period.

3. The device of claim 1, wherein, when the rule requested to be registered generates the static conflict, the local rule manager informs the service requester that the rule requested to be registered generates the static conflict.

4. The device of claim 1, wherein, when the event satisfies the condition and a dynamic conflict in which the retrieved rule describes an action that cannot be simultaneously executed with an action described in another rule that is currently being executed does not occur, the action executor executes the action of the retrieved rule.

5. The device of claim 1, wherein, when the rule requested to be registered does not generate the static conflict but there is a possibility of an occurrence of a dynamic conflict in which the rule requested to be registered describes an action that cannot be simultaneously executed with an action described in another rule, after a dynamic conflict resolution rule for solving the dynamic conflict is registered, the local rule manager stores the rule requested to be registered, and wherein, when the event satisfies the condition but generates a dynamic conflict in which the retrieved rule describes the action that cannot be simultaneously executed with the action described in another rule that is currently being executed, the action executor solves the dynamic conflict by using the dynamic conflict resolution rule.

6. The device of claim 1, further comprising: a temporal event generator generating a temporal event by using the rules stored in the rule storage; and a complex event inspector delivering to the rule engine the event generated by the temporal event generator, an event delivery message received from an event source, and an event generated by the action executor, wherein, when a rule describing the generated event further describes another event besides the currently received event, the complex event detector waits to receive the other event, and wherein, when the rule describing the generated event does not further describe another event besides the currently received event, the condition inspector inspects a condition of the rule describing the event.

7. The device of claim 1, wherein the device receives messages to register, change, or delete the rule, temporarily suspend the application of the rule, or resume the suspended application of the rule from a service requester and delivers responses to the messages to the service requester.

8. A method of using rules based on web services comprising:
   (a) storing rules describing an event, a condition to be satisfied by the event, and an action to be executed when the condition is satisfied;
   (b) when an event occurs, retrieving a rule describing the event from the rules stored in a rule storage;
   (c) inspecting whether or not the event satisfies a condition described in the retrieved rule; and
   (d) when the event satisfies the condition, executing an action described in the retrieved rule, wherein in (a), when the rule is requested to be registered by a service requester and the rule requested to be registered does not generate a static conflict in which the rule requested to be registered describes the same event and condition as those of other rules but describes an action that cannot be simultaneously executed, the rule requested to be registered is stored.

9. The method of claim 8, wherein in (a), when the rule requested to be registered is within a valid period, the rule requested to be registered is stored.

10. The method of claim 8, wherein in (a), when the rule requested to be registered generates the static conflict, the service requester is informed that the rule requested to be registered generates the static conflict.

11. The method of claim 8, wherein in (d), when the event satisfies the condition and the retrieved rule does not generate a dynamic conflict in which the retrieved rule describes an action that cannot be simultaneously executed along with an action described in another rule that is currently being executed, the action of the retrieved rule is executed.

12. The method of claim 8, wherein in (a), when the rule requested to be registered does not generate the static conflict but there is a possibility that the rule requested to be registered generates the dynamic conflict in which the rule requested to be registered describes an action that cannot be simultaneously executed along with actions described in other rules, after a dynamic conflict resolution rule for solving the dynamic conflict is registered, the rule requested to be registered is stored, and wherein in (d), when the event satisfies the condition but the retrieved rule generates the dynamic conflict in which the retrieved rule describes an action that cannot be simultaneously executed along with an action described in another rule that is currently being executed, the dynamic conflict is solved by using the dynamic conflict resolution rule.

13. The method of claim 8, wherein (b) comprises: (b1) receiving a temporal event generated by the stored rule, an event delivery message received from an event source, and an event generated in (d); (b2) retrieving a rule describing the event received in (b1); and (b3) when the retrieved rule further describes another event besides the currently received event, waiting to receive the other event, wherein in (c), when the retrieved rule does not further describe another event besides the currently received event, inspecting a condition of the rule describing the event.

14. A method of using rules based on web services comprising: (a) determining whether or not a rule describing an event, a condition to be satisfied by the event, and an action to be executed when the condition is satisfied generates a static conflict in which the rule describes the same event and condition as those of other rules but describes an action that cannot be simultaneously executed; (b) when the rule does not generate the static conflict, determining whether or not there is a possibility of an occurrence of a dynamic conflict in which the rule describes an action that cannot be simultaneously executed along with actions described in other rules; and (c) when an event occurs, determining whether or not a rule describing the event generates the dynamic conflict in which the rule describes an action that cannot be simultaneously executed with an action described in a rule to be currently executed.

15. The method of claim 14, further comprising: when there is a possibility that a rule requested to be registered by a service requester generates the dynamic conflict and the dynamic conflict occurs, receiving a dynamic conflict resolution rule for solving the dynamic conflict from the service requester, storing the dynamic conflict resolution rule, and storing the rule requested to be registered; and when the rule requested to be registered generates the dynamic conflict, delivering a resolution according to the dynamic conflict resolution rule to a device executing an action of the rule.

16. The method of claim 14, wherein in (b), the rule that has the possibility of the occurrence of a dynamic conflict is marked to represent the possibility of the occurrence of a dynamic conflict, and wherein in (c), when a rule describing the event is marked, it is determined whether or not the rule generates a dynamic conflict.

* * * * *